United States Patent

[11] 3,617,681

[72] Inventor Warren F. Dyson
 Richmond, Va.
[21] Appl. No. 824,195
[22] Filed May 13, 1969
[45] Patented Nov. 2, 1971
[73] Assignee C & W Control Company

[54] APPARATUS FOR GAS ARC WELDING
 6 Claims, 1 Drawing Fig.
[52] U.S. Cl. .................................................. 219/74,
 219/131
[51] Int. Cl. .................................................. B23k 9/10
[50] Field of Search .......................................... 219/74, 75,
 130, 131, 135

[56] References Cited
 UNITED STATES PATENTS
 2,717,948 9/1955 Cockrell et al. .............. 219/130

Primary Examiner—J. V. Truhe
Assistant Examiner—J. G. Smith
Attorneys—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland ABSTRACT: Apparatus for maintaining the flow of an inert gas around the electrode of an inert gas arc welder. The welder operator momentarily depresses a pushbutton which commences the gas flow. A sensor detects the arc welding current to maintain the gas flow so long as that current is present. After the arc is broken, the gas flow is maintained for sufficient time to cool and protect the weld and electrode, and then the gas flow is automatically terminated.

3,617,681
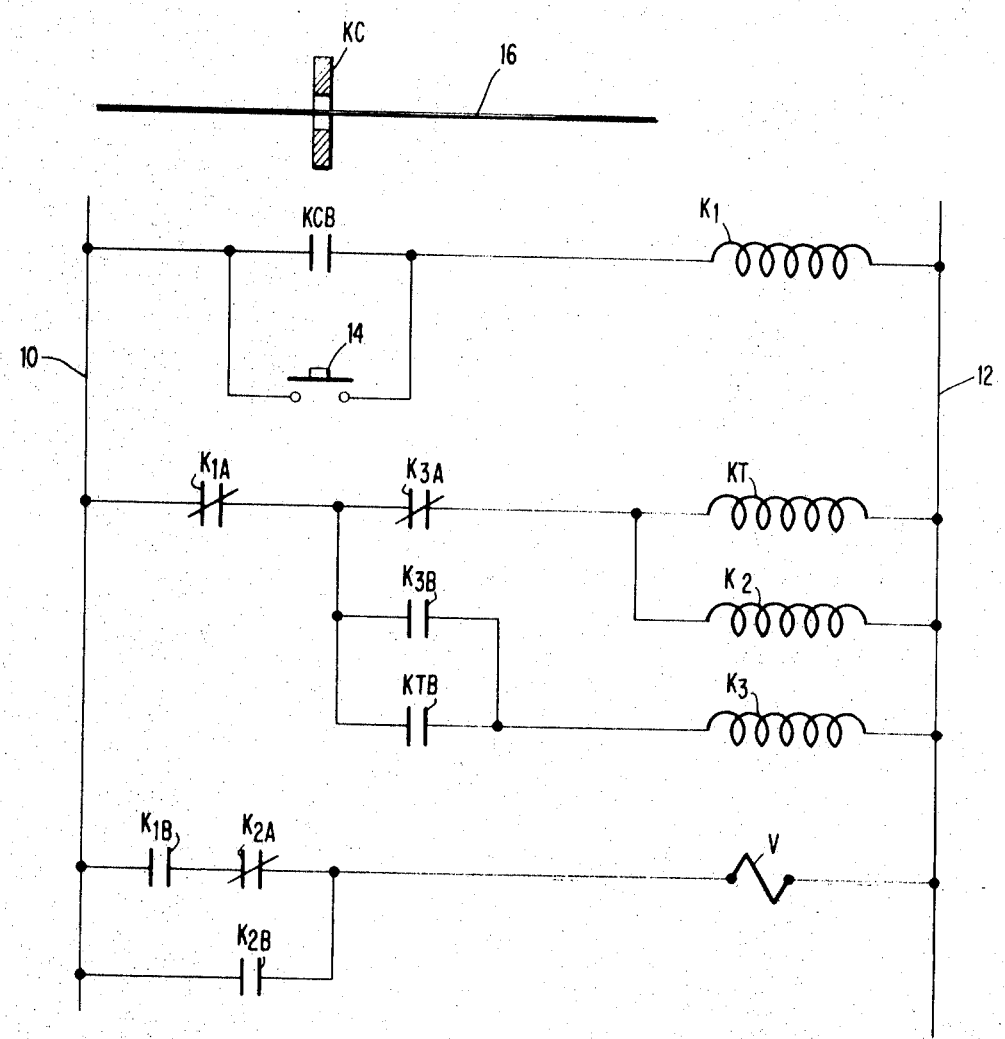
INVENTOR
WARREN F. DYSON
BY McLean, Morton & Boustead
ATTORNEYS

3,617,681

APPARATUS FOR GAS ARC WELDING

The present invention pertains to welding control apparatus. More particularly, the present invention pertains to apparatus for controlling the flow of an inert gas which is used in conjunction with an inert gas arc welder.

During many arc welding operations, it is desirable to surround the arc and electrode with an inert gas shield. This shield prevents atmospheric gas from contacting the hot welding electrode, and it cools and protects the weld as it is formed. Numerous inert gases might be utilized for this purpose, and argon is frequently used in such operations. It is desirable to commence the gas flow a short time before the welding is commenced to purge the weld zone of atmospheric gases. After the welding arc has terminated, it is desirable to continue the flow of the inert gas to provide continued shielding until the weld and electrode have cooled enough that it is unlikely to be harmed by atmospheric oxygen.

The provision of a shielding gas in conjunction with an arc welding operation requires the control of the gas supply, as well as control of the welder. Generally the gas supply is equipped with a valve to permit control of the gas flow as desired. Numerous welding heads exist which incorporate means for causing gas to flow in the desired area around the weld. Typical of these are the welding heads disclosed in U.S. Pat. Nos. 2,776,361 and 3,349,215.

The welding operator generally must direct his attention to the weld as it is being formed in order to assure that a good weld results. Consequently, it is undesirable for the operator to have to give his attention to or to manually operate the gas control valve. Although he might be able to manually control the gas, this is undesirable not only because it takes his attention away from the welding operation itself, but also because it can result in wasting the gas since the operator frequently must be performing other operations when the gas flow should be started or stopped. It is consequently a frequent practice simply to turn on the gas and permit it to flow continuously. This obviously wastes much gas.

In addition, it often happens that the operator starts the flow of shielding gas, but then for some reason fails to strike his welding arc. For example, he may find that the pieces to be welded are not in exactly the correct positions and must be moved. In such instances, he likely will immediately take care of whatever situation prevented him from striking his arc, without first shutting off the flow of gas. This unused gas may flow for considerable time. If the operator finds he must leave the apparatus, the gas could flow unused until he returns. This, quite obviously, is also wasteful of the shielding gas.

The present invention is an apparatus for controlling the flow of inert shielding gas used in conjunction with an arc welder. In accordance with this invention, once the gas flow is initiated, all of the control takes place automatically. When it is desired to start the gas flow, the operator momentarily depresses a pushbutton and then strikes his arc. If the operator fails to initiate gas flow manually, the gas flow will be automatically initiated by the arc welder current upon the striking of an arc. The gas flow is maintained for so long as the arc welder current continues to flow. After the arc is terminated, timing means maintain the gas flow for sufficient time to provide sufficient cooling around electrode and around the formed weld. The gas flow is then automatically terminated. In the event the welder operator manually initiates the gas flow but fails to strike an arc within a preset time, the apparatus automatically terminates the gas flow.

These and other aspects and advantages of the present invention are apparent in the following detailed description and claims, particularly when read in conjunction with the accompanying drawing which is a schematic diagram of a preferred embodiment of the present invention.

As depicted in the drawing, excitation lines 10 and 12 are coupled across a suitable voltage source such as a source of 110 volts AC Normally open pushbutton 14 is located on the welding head so that it can be conveniently depressed by the welder operation. Pushbutton 14 is serially connected with relay coil K1 a cross excitation liner 10 and 12. Welder current conductor 16 carries the welding current to the head of the arc welder. Current detector relay KC includes a current detector which senses weld current flow through conductor 16 and in response thereto closes normally open relay contacts KCB which are in parallel with pushbutton 14. By way of example, current detector relay KC might be a current relay of the type manufactured by Automatic Switch Co., Florham Park, New Jersey, and described in that company's Bulletin 1054-151.

Normally closed relay contact K1A is serially connected with normally closed relay contact K3A and the parallel combination of relay coil K2 and time-delay relay coil KT across excitation lines 10 and 12. In addition, the parallel combination of normally open relay contact K3B and normally open time-delay relay contact KTB is serially connected with relay contact K1A and the control element or coil of relay K3 across lines 10 and 12. Normally open relay contact K1B and normally closed relay contact K2A are serially connected in parallel with normally open relay contact K2B, and this combination is in series with solenoid V across excitation lines 10 and 12. Solenoid V operates the gas flow valve which controls the flow of gas around the welding electrode.

In the drawing, the relay contacts are all shown in the deenergized condition. Each relay K1, K2 and K3 has a normally closed contact, such as contact K1A, and a normally open contact, such as contact K1B, thus providing first and second current paths for each of these relays. With excitation provided on lines 10 and 12 and the circuit stabilized, the quiescent condition of the circuit finds relay coil K3 energized, and all the other relay coils deenergized. Consequently, contact K3A is open, and contact K3B is closed. Solenoid V is deenergized, and so the gas flow valve is closed, preventing gas from flowing around the welding electrode.

When the operator desires to start a weld, he depresses pushbutton 14, permitting current to flow from excitation line 10 through pushbutton 14 and relay coil K1 to line 12. As a result normally open relay contact K1B closes, and normally closed relay contact K1A opens, deenergizing relay coil K3. A current path exists from line 10, through contact K1B, normally closed relay contact K2A and solenoid V to line 12. Solenoid V opens the gas flow valve, permitting shielding gas to flow around the arc welder electrode.

The momentary energization of relay coil K1, in response to closure of pushbutton 14, closes relay contact K1B, and so solenoid V is energized through contacts K1B and K2A. Upon release of pushbutton 14, relay K1 deenergizes if no welder current is flowing in conductor 16, and so contact K1B opens; however, contact K1A closes, energizing relay coil K2, and so contact K2B closes, maintaining a current path to solenoid V. During this interval before welding commences, the gas flow purges the weld zone of atmospheric oxygen.

The welder operator then strikes his arc and weld current flows through conductor 16. This current is detected by current detector relay KC, and as a result normally open relay contact KCB closes and remains in it closed position so long as the weld current flows in conductor 16. Since contact KCB is in parallel with pushbutton 14, relay coil K1 is energized whenever weld current flows through conductor 16, even though pushbutton 14 is released. Relay contact K1A opens, deenergizing relay coil K2, and relay contacts K1B and K2A close, while contact K2B opens. A current path continues to exist to solenoid V through contacts K1B and K2A, and so the gas flow valve is maintained in its open position to provide shielding gas for so long as the weld current flows.

Once the weld arc is broken, current no longer flows in conductor 16, and relay contact KCB opens. As a result, relay coil K1 is deenergized, and contact K1B returns to its open position, while contact K1A closes. The closure of contact K1A provides a current path from line 10 through contact K1A, normally closed contact K3A, and relay coil K2 to line 12. Consequently, normally closed contact K2A opens, and normally open contact K2B closes. Since contact K2B is in parallel with the serial combination of contacts K1B and K2A, the gas flow valve is maintained in its open position, thereby causing gas to continue to flow. Current is also provided to the coil of time-delay relay KT which is in parallel with relay coil K2. After a time delay during which the inert gas cools the weld, for example, a delay in the order of 15 seconds, time-delay relay coil KT is energized. Its normally open contact KTB then closes, providing a current path from line 10, through contacts K1A and KTB and through relay coil K3, to line 12. As a result normally closed relay contact K3A opens, breaking the current path to relay coils K2 and KT. Normally open contact K3B, which is in parallel with contact KTB, closes, holding coil K3 energized. Upon deenergization of coil K2, contact K2B opens and contact K2A closes. Since contact K1B is open, no current path exists to solenoid V; therefore, the gas flow valve closes, terminating the gas flow around the weld. The system remains in this quiescent condition, with only relay coil K3 energized, until the operator again depresses pushbutton 14.

If the operator fails to depress pushbutton 14 prior to striking an arc, the apparatus is in its quiescent condition at the time the welder current commences to flow in conductor 16. That current is detected by relay KC, and contact KCB closes, energizing relay coil K1 to initiate operation of the gas flow control apparatus.

In the event that, for some reason, after the welder operator depresses pushbutton 14 to commence the gas flow, he fails to strike his welding arc, no current ever flows in weld current conductor 16, and so contact KCB never closes. The opening of relay contact K1A in response to the pushbutton closure removes the apparatus from its quiescent condition and starts the gas flow. Upon release of pushbutton 14, contact K1A again closes, providing current to relay coils K2 and KT. Closure of contact K2B maintains the gas flow which commenced when pushbutton 14 was depressed, but after time-delay relay KT is energized, its contact KTB closes, energizing relay coil K3, terminating gas flow, and returning the apparatus to its quiescent condition. Thus, in the event the operator fails to strike his arc within the time required for relay KT to be energized following release of pushbutton 14, the gas flow automatically terminates, thereby conserving gas without requiring additional manipulation by the operator.

While the drawing depicts the relays K1, K2, K3, and KT and solenoid V all connected across the same excitation source, one or more transformers could be utilized to provide different voltages for some of these components if desired. Likewise, other control devices than relays might be utilized, so long as the control device has a control element corresponding to the relay coil input, a source element corresponding to the relay contact input, and an output element corresponding to the relay contact output. For example, fluid amplifiers or other types of electrical switching devices such as transistors might be utilized in place of relays K1, K2, K3, and KT.

What is claimed is:

1. Gas flow control apparatus for controlling flow of gas in conjunction with electric arc welding equipment comprising:
a. weld current sensing means for detecting presence of weld current to electric arc welding equipment;
b. gas flow regulating means adapted for connection to a supply of gas for controlling gas flow from the supply;
c. first, second and third electrical switching means; each of said first, second, and third electrical switching means including a control element and first and second circuit paths; each of said first, second, and third electrical switching means normally assuming a first condition in which electrical current flow is permitted in its first circuit path and in which electrical current flow is blocked in its second circuit path and, in the presence of an energizing signal at its control element, assuming a second condition in which electrical current flow is blocked in its first circuit path and in which electrical current flow is permitted in its second circuit path;
d. fourth electrical switching means including a control element and a circuit path, said fourth electrical switching means normally assuming a first condition in which electrical current flow is blocked in its circuit path and in the presence of an energizing signal of at least a preset minimum duration at its control element assuming a second condition in which electrical current flow is permitted in its circuit path;
e. means responsive to said weld current sensing means for applying an energizing signal to said first electrical switching means control element when weld current is present;
f. means connecting said first electrical switching means first circuit path, said third electrical switching means first circuit path, and said second electrical switching means control element in circuit for providing an energizing signal to said second electrical switching means control element when said first electrical switching means is in its first condition and said third electrical switching means is in its first condition;
g. means connecting said first electrical switching means first circuit path, said third electrical switching means first circuit path, and said fourth electrical switching means control element in circuit for providing an energizing signal to said fourth electrical switching means control element when said first electrical switching means is in its first condition and said third electrical switching means is in its first condition;
h. means connecting said first electrical switching means first circuit path, said third electrical switching means second circuit path and said third electrical switching means control element in circuit for providing an energizing signal to said third electrical switching means control element when said first electrical switching means is in its first condition and said third electrical switching means is in its second condition;
i. means connecting said first electrical switching means first circuit path, said fourth electrical switching means circuit path, and said third electrical switching means control element in circuit for providing an energizing signal to said third electrical switching means control element when said first electrical switching means is in its first condition and said fourth electrical switching means is in its second condition;
j. means connecting said first electrical switching means second circuit path, said second electrical switching means first circuit path and said regulating means in circuit for activating said regulating means to cause gas to flow when said first electrical switching means is in its second condition and said second electrical switching means is in its first condition; and
k. means connecting said second electrical switching means second circuit path and said regulating means in circuit for activating said regulating means to cause gas to flow when said second electrical switching means is in its second condition.

2. Apparatus as claimed in claim 1 further comprising manually operable control means for supplying an energizing signal to said first electrical switching means control element upon operation of said manually operable control means.

3. Apparatus as claimed in claim 2 in which said first, second and third electrical switching means comprise first, second, and third electromagnetic relays respectively, each relay including a relay coil, first and second fixed contacts, and a contact movable between a first position in which it contacts its associated first fixed contract to form the first circuit path for that relay and a second position in which it contacts its associated second fixed contact to form the second circuit path for that relay.

4. Apparatus as claimed in claim 3 in which said fourth electrical switching means comprises a time-delay relay.

5. Apparatus as claimed in claim 2 in which said first, second, and third electrical switching means comprise first, second, and third electromagnetic relays respectively, each relay including a relay coil, a pair of normally closed contacts, and a pair of normally open contacts.

6. Apparatus as claimed in claim 5 in which said fourth electrical switching means comprises a time-delay relay.

* * * * *